United States Patent
Lafleur et al.

(10) Patent No.: US 10,282,199 B2
(45) Date of Patent: May 7, 2019

(54) SELECTING A SOFTWARE DEVELOPMENT KIT (SDK) OF AN APPLICATION TO BE ACTIVATED BASED ON CHARACTERISTICS OF THE APPLICATION

(71) Applicant: Verizon Patent and Licensing Inc., Basking Ridge, NJ (US)

(72) Inventors: Alex Lafleur, Denver, CO (US); Elise Neel, Castle Rock, CO (US); Michael Raymond Pyle, Jr., Thornton, CO (US); Seth Musselman, Denver, CO (US); Jai Setlur, Denver, CO (US); Joseph T. Hopson, Arvada, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/695,931

(22) Filed: Sep. 5, 2017

(65) Prior Publication Data
US 2019/0073214 A1   Mar. 7, 2019

(51) Int. Cl.
*G06F 8/20* (2018.01)
*G06F 8/71* (2018.01)

(52) U.S. Cl.
CPC . *G06F 8/71* (2013.01); *G06F 8/20* (2013.01)

(58) Field of Classification Search
CPC .......... G06F 17/3053; G06F 8/71; G06F 8/65; G06F 8/68; G06F 8/20
USPC .................................................. 717/100, 101
See application file for complete search history.

(56) References Cited

U.S. PATENT DOCUMENTS

| | | | | |
|---|---|---|---|---|
| 9,400,693 | B2* | 7/2016 | Niimura | G06F 9/485 |
| 9,535,662 | B2* | 1/2017 | Ohhashi | G06F 8/30 |
| 9,854,426 | B1* | 12/2017 | Wang | H04W 8/02 |
| 2012/0054758 | A1* | 3/2012 | Wataishi | G06Q 10/06 718/102 |
| 2012/0233624 | A1* | 9/2012 | Niimura | G06F 9/485 718/103 |
| 2013/0283274 | A1* | 10/2013 | Mimran | G06F 9/46 718/100 |
| 2014/0082581 | A1* | 3/2014 | Ohhashi | G06F 8/30 717/100 |
| 2014/0155174 | A1* | 6/2014 | Laakkonen | A63F 13/12 463/42 |
| 2014/0278766 | A1* | 9/2014 | Dudkiewicz | H04L 67/34 705/7.29 |
| 2014/0280693 | A1* | 9/2014 | Schwanitz | H04L 29/08108 709/217 |
| 2014/0359552 | A1* | 12/2014 | Misra | H04L 67/12 717/100 |
| 2016/0071169 | A1* | 3/2016 | Han | G06Q 30/0277 705/14.61 |

(Continued)

*Primary Examiner* — Marina Lee

(57) ABSTRACT

According to some implementations, a device can include one or more processors to obtain a characteristic of a first application; obtain a setting of a software development kit (SDK) of the first application; obtain activation information from an SDK of a second application, the activation information including a characteristic of the second application and a setting of the SDK of the second application; compare the activation information to the characteristic of the first application and the setting of the SDK; and/or perform an action associated with the SDK of the first application based on comparing the activation information to the characteristic of the first application and the setting of the SDK.

20 Claims, 9 Drawing Sheets

(56) References Cited

U.S. PATENT DOCUMENTS

2017/0052835 A1\* 2/2017 Cook ................... G06F 9/547
2017/0060568 A1\* 3/2017 Seibert, Jr. ............ G06F 8/65
2017/0147323 A1\* 5/2017 Hu ...................... H04L 67/34
2018/0075032 A1\* 3/2018 Kimura ............ G06F 17/30029

\* cited by examiner

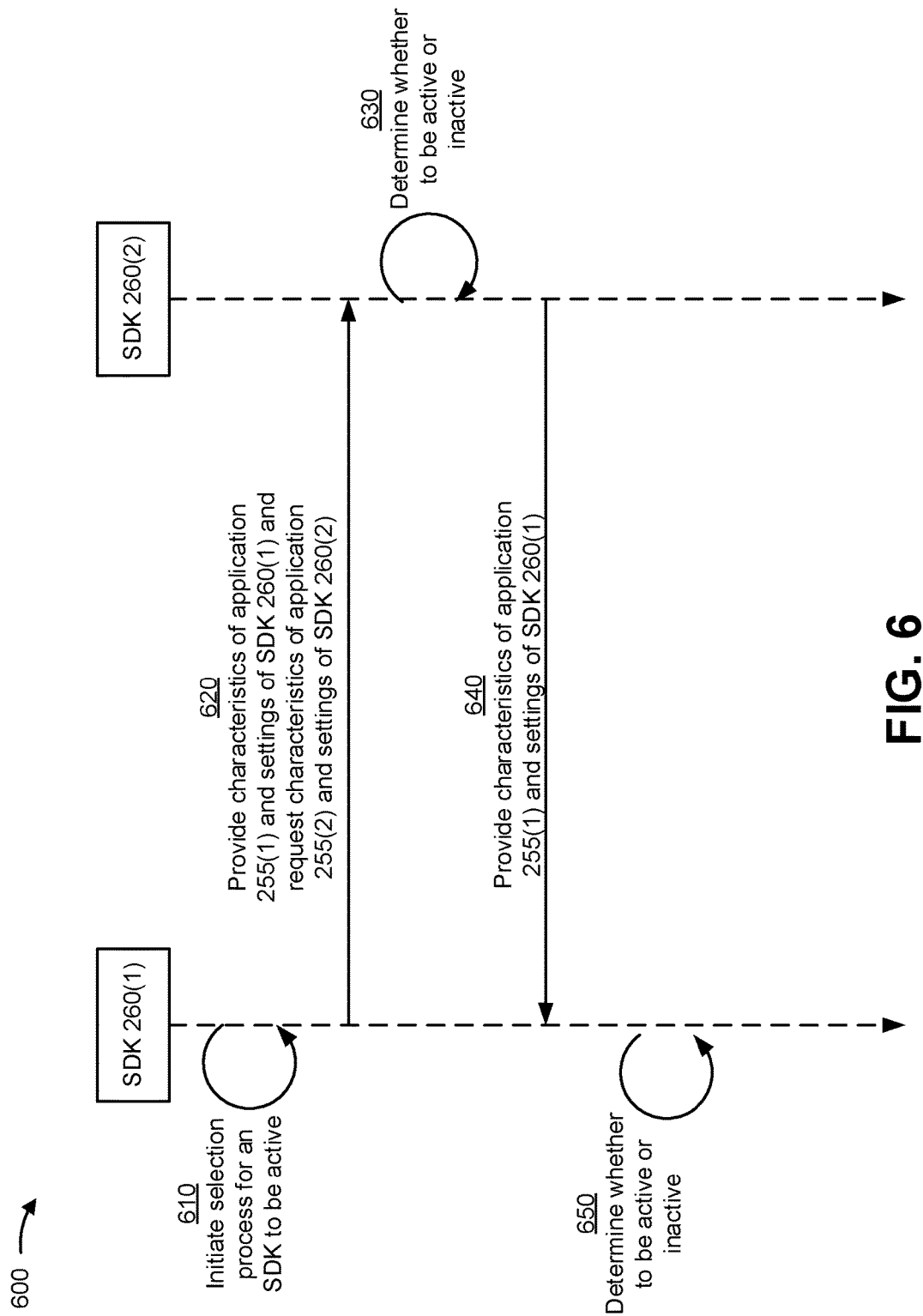

SELECTING A SOFTWARE DEVELOPMENT KIT (SDK) OF AN APPLICATION TO BE ACTIVATED BASED ON CHARACTERISTICS OF THE APPLICATION

BACKGROUND

A software development kit (SDK) can include a set of software development tools that enables creation of applications for a certain software package, software framework, hardware platform, computer system, operating system, or similar development platform. In some instances, SDKs can be included within or integrated into applications to facilitate backend functionality, such as enabling advertisements, push notifications, and/or the like.

BRIEF DESCRIPTION OF THE DRAWINGS

FIG. 6 is a flow diagram of an example implementation relating to the example process shown in FIG. 4.

DETAILED DESCRIPTION OF PREFERRED EMBODIMENTS

The following detailed description of example implementations refers to the accompanying drawings. The same reference numbers in different drawings can identify the same or similar elements.

While some software development kits (SDKs) can be unique to particular applications, in some instances, a same SDK can be installed on multiple applications on a same user equipment (UE). A same SDK running on multiple applications can be unnecessary as running the same SDK is duplicative in that the SDKs are performing the same tasks (e.g., collecting and/or providing the same data, type of data, or amount of data associated with the UE). Accordingly, duplicative use of a same SDK running on multiple applications wastes resources (e.g., battery power, computing power, storage) and/or can diminish performance of the UE. For example, if multiple instances of the same SDK require use of a global positioning system (GPS) of the UE and/or make calls to a system in communication with the UE, then the UE can be using twice, three-times, four-times, and so on the number of resources than a single instance of the SDK would need to use the GPS and/or make the calls and achieve the same end result. Some implementations herein provide a selection process for SDKs of a particular application to be activated based on characteristics and/or configurations of multiple applications running the SDKs and/or individual settings of instances of the SDKs on the multiple applications.

In some implementations, instances of a same SDK (which can be referred to herein as a "same SDK" or "the SDK") on multiple applications can communicate with one another to establish which of the SDKs are to be activated and/or deactivated to collect and/or provide information associated with a UE. According to some implementations, the SDKs of the applications can determine which of the SDKs of the applications are to be activated and/or deactivated based on characteristics of the applications (e.g., user authorizations, application settings, application permissions, and/or the like) and/or characteristics of the SDKs (e.g., whether the SDK is activated or deactivated, whether the SDK initiated an activation selection process with other SDKs, and/or the like). As such, some implementations herein can enable one instance of an SDK that is integrated in multiple applications of a UE to be activated to reduce or eliminate duplicative operations of the SDK running on multiple applications, thus preserving resources (e.g., battery power, computing power, and/or the like) of the UE. Accordingly, in such implementations, that enabled instance can be the only enabled instance of that SDK running on the UE.

Figure 1A:
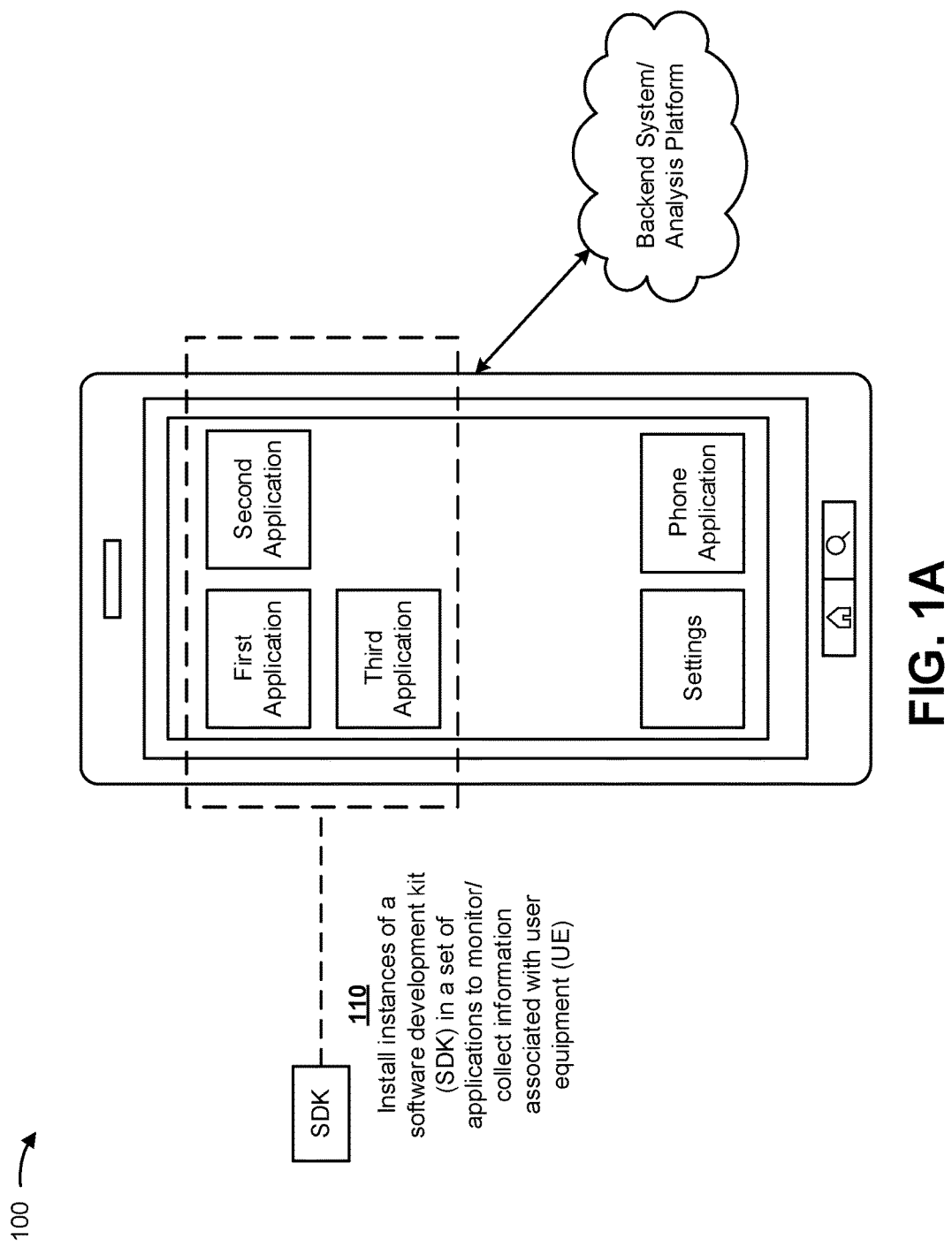
FIGS. 1A-1C are diagrams of an overview of an example implementation described herein.
Figure 1B:
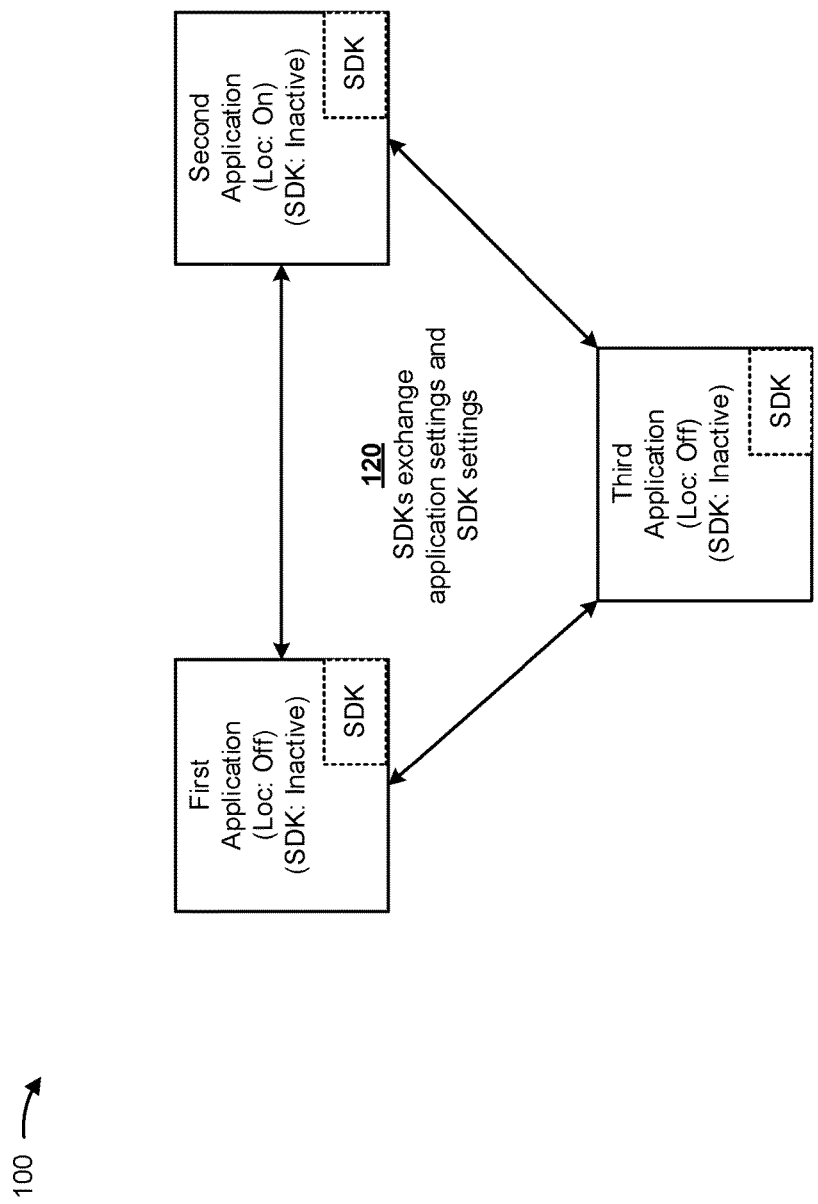
Figure 1C:
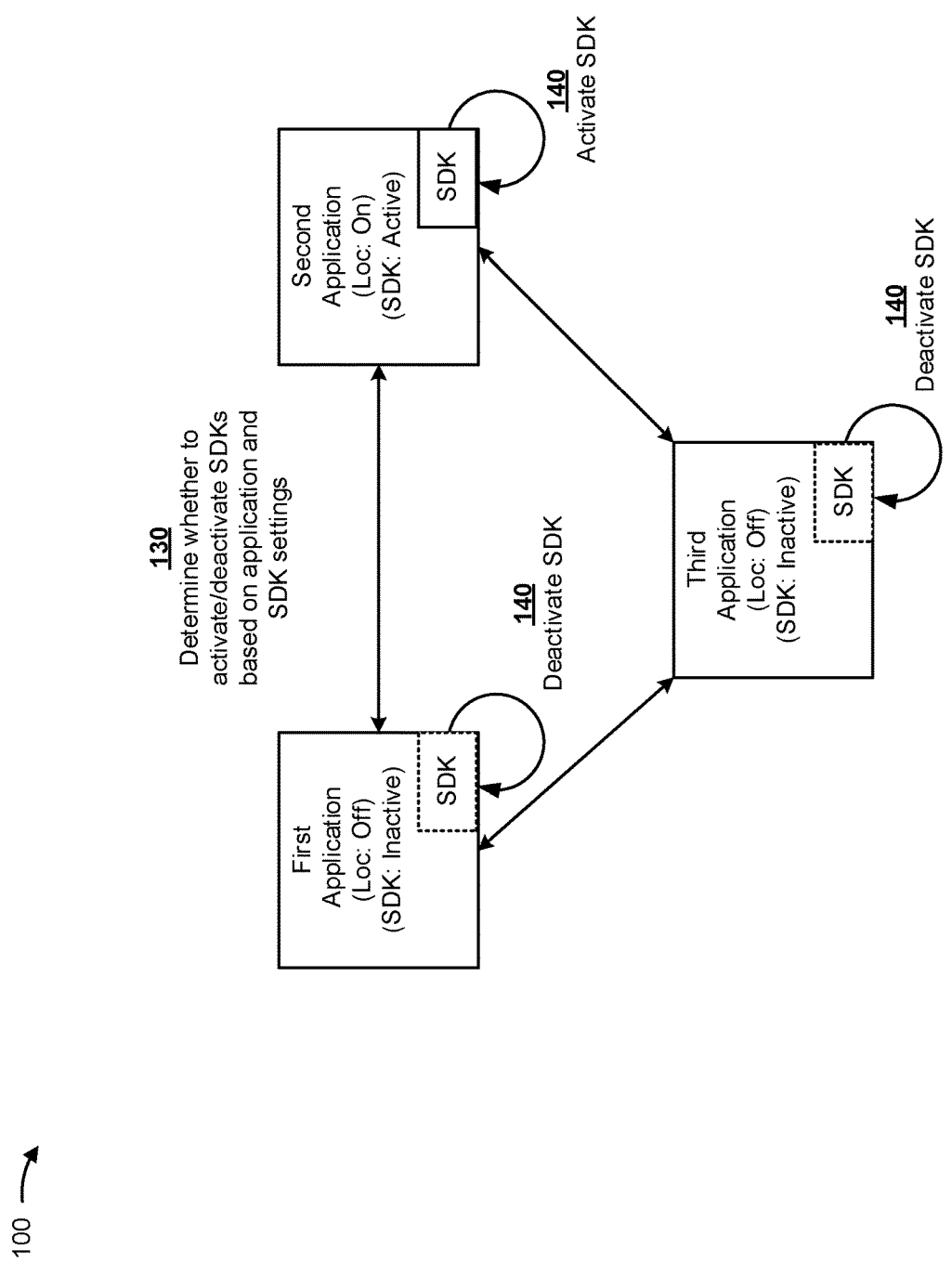

FIGS. 1A-1C are diagrams of an overview of an example implementation 100 described herein. In FIGS. 1A-1C, applications of a UE include an SDK. As shown, the SDKs of the applications communicate with one another to determine which one of the SDKs is to be activated and which of the SDKs are to be deactivated based on characteristics of the applications and/or characteristics of the SDKs.

In FIG. 1A, instances of an SDK are installed in a set of applications of a UE (shown as a smartphone) to monitor and/or collect information associated with the UE, as shown by reference number 110. Accordingly, the same SDK can be installed on each of the applications. In other words, in the example implementation 100 of FIGS. 1A-1C, the instances of the SDK are implemented by same development tools and/or provide a same functionality (e.g., collection of a same type of data, same status information, providing same information, and/or the like)). In some implementations, the SDKs can be different SDKs (e.g., different SDKs that collect and/or provide a same type of information or data, but in different ways or with different functions).

As shown in FIG. 1A, the SDK can be installed on a first application, a second application, and a third application (referred to collectively herein in accompaniment with the description of FIGS. 1A-1C as "the applications"). The applications can be any application of the UE. Some examples of the applications can include one or more messenger applications, account manager applications, cloud applications, location/navigation applications, gaming applications, augmented reality applications, multimedia applications, marketplace applications, retail application, banking applications, and/or the like. The applications can be a same or different type of application. For example, the first application, second application, and third application can each be a messenger application or the first application may be a messenger application, the second application may be a cloud application, and the third application may be a multimedia application.

In some implementations, the first application, the second application, and/or the third application can be associated with a same entity associated with the SDK. For example, such an entity can be an entity that has access to development tools of the SDK and/or the applications to enable the same SDK to be installed on the applications. Additionally, or alternatively, the SDK and other SDKs can be configured to notify or coordinate with one another. In some implementations, the SDKs can coordinate and/or communicate with all SDKs running on the UE (e.g., including an SDK of a "settings application" or an SDK of a "phone application"

shown in the example implementation 100) by broadcasting communications to all the SDKs.

In FIG. 1B, with the SDK installed (represented by the dotted "SDK" block) on the first application, second application, and third application, the SDKs exchange characteristics of the respective applications (which can be referred to herein as "application characteristics") and/or SDK settings with one another, as shown by reference number 120. For example, one of the SDKs (e.g., the SDK of the second application) can broadcast application characteristics and/or SDK settings along with a status request communication to the other SDKs. In response, the SDKs can provide information associated with the application and/or the SDK to one another. For example, the SDKs can provide user authorization information (e.g., whether a user has authorized use of the SDK in the respective application), application settings/capabilities (e.g., whether location services are enabled for the application), a state of the SDK (e.g., whether the SDK is currently active or inactive), and/or the like. As shown in FIG. 1B, a location setting (Loc: On/Off) is provided among the SDKs of the applications and a SDK setting (e.g., SDK: active/inactive) is exchanged between the SDKs of the applications indicating whether the location services of the application are on or off and whether the SDK is currently active or inactive.

In FIG. 1C, each of the SDKs determines whether to activate/deactivate itself based on the characteristics of the applications and SDKs settings of the respective SDKs, as shown by reference number 130. For example, each of the SDKs can compare the SDK's own application characteristics and/or SDK settings to the application characteristics and/or SDK settings of the other SDKs. More specifically, the SDK of the second application can compare the second application location setting and the SDK setting to the location settings and the SDK settings of the other applications. In some implementations, the SDKs can implement a scoring system and/or weighting system for the application characteristics and/or SDK settings to determine which SDK is to be activated or deactivated. For example, if location services can receive a first score for on and second score for off and SDK setting can receive a third score of active and a fourth score for inactive. Each of the SDKs, in calculating the scores of itself and the other SDKs, can determine which SDK scored the highest, and thus which SDK is to be active.

As shown in FIG. 1C, the second application is the only application that had location services "on." Accordingly, the SDK of the second application can set itself, the SDK of the second application, as the active SDK while the SDKs of the first application and third application deactivate themselves (or keep themselves inactive), as shown by reference number 140.

Accordingly, as shown in the example implementation 100 of FIGS. 1A-1C, the SDKs of the applications can determine which of the SDKs is to be active and which are to be inactive to prevent running duplicative SDKs on the UE and wasting resources of the UE.

As indicated above, FIGS. 1A-1C is provided merely as an example. Other examples are possible and can differ from what was described with regard to FIGS. 1A-1C.

Figure 2A:
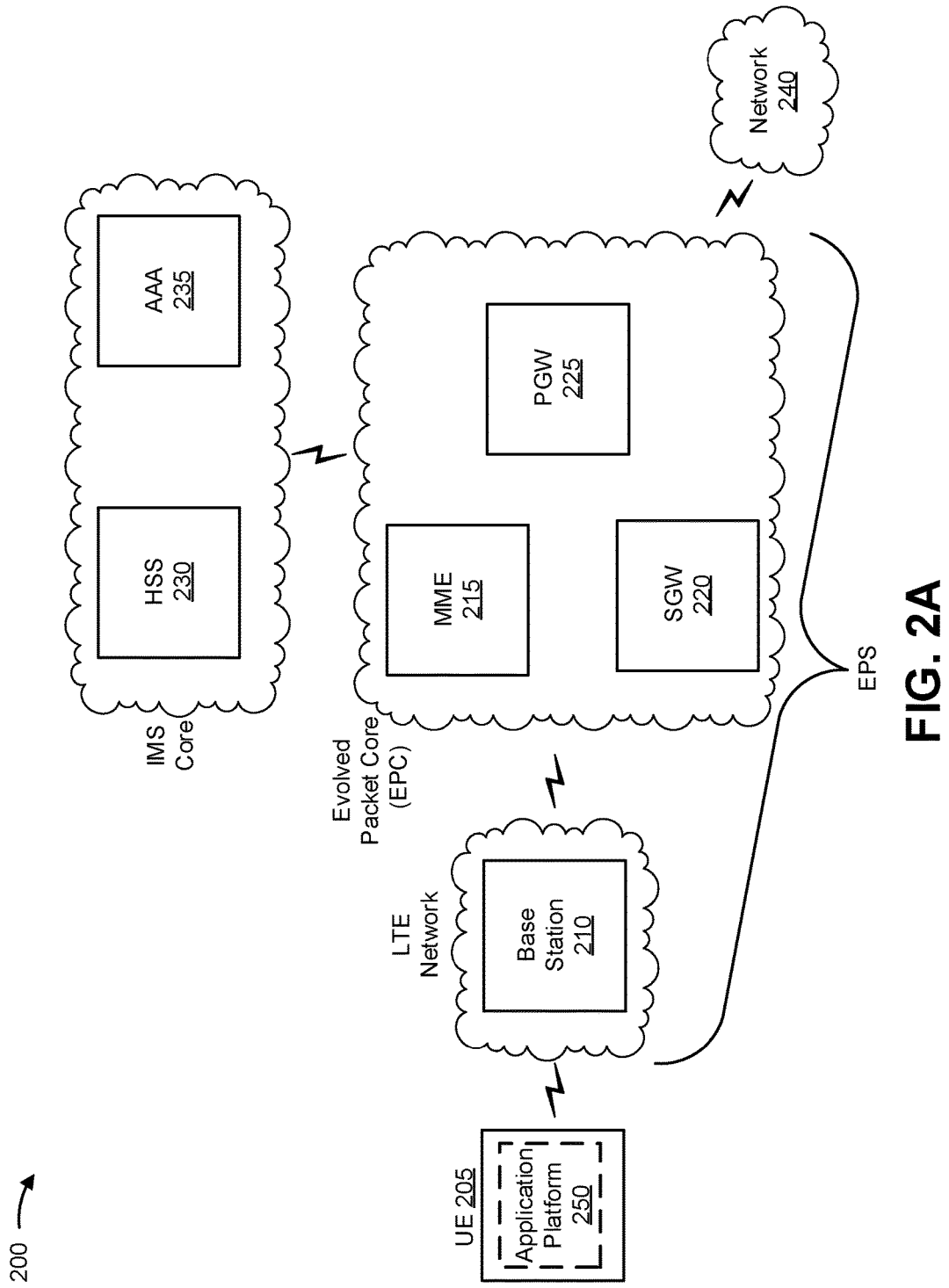
FIGS. 2A and 2B are a diagrams of an example environment in which systems and/or methods, described herein, can be implemented.
Figure 2B:
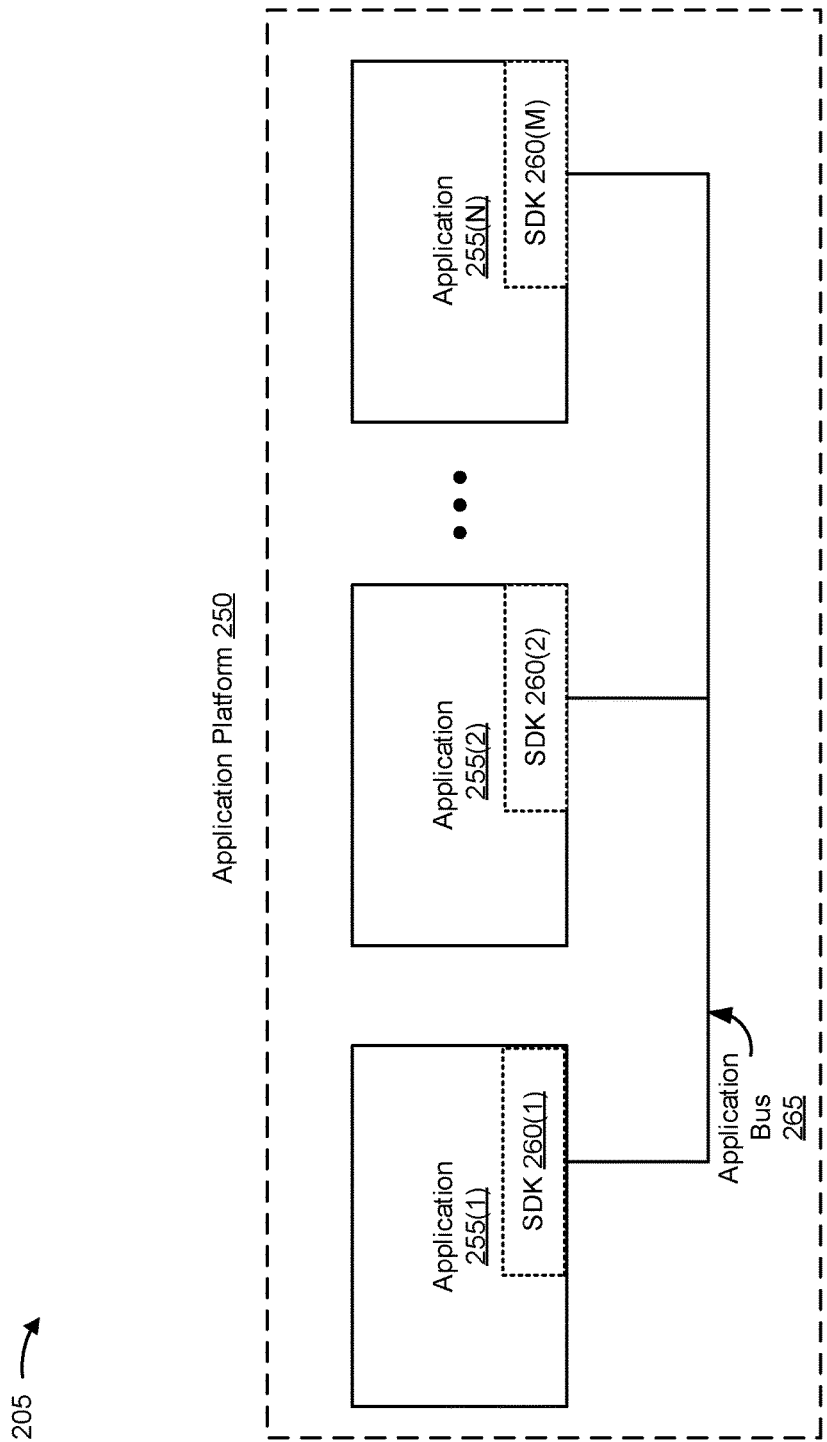

FIGS. 2A and 2B are diagrams of an example environment 200 in which systems and/or methods, described herein, can be implemented. As shown in FIG. 2A, environment 200 can include a UE 205; a base station 210; a mobility management entity device (MATE) 215; a serving gateway (SGW) 220; a packet data network gateway (PGW) 225; a home subscriber server (HSS) 230; an authentication, authorization, and accounting server (AAA) 235; and a network 240. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which UE 205 communicates with the EPC. The EPC can include MME 215, SGW 220, and/or PGW 225 that enable UE 205 to communicate with network 240 and/or an Internet protocol (IP) multimedia subsystem (IMS) core. The IMS core can include HSS 230 and/or AAA 235, and can manage device registration and authentication, session initiation, etc., associated with user equipment 205. HSS 230 and/or AAA 235 can reside in the EPC and/or the IMS core.

UE 205 can include one or more devices capable of communicating with base station 210 and/or a network (e.g., network 240). For example, UE 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. UE 205 can send traffic to and/or receive traffic from network 240 (e.g., via base station 210, SGW 220, and/or PGW 225). According to some implementations herein, UE 205 includes an application platform 250. Application platform 250 can include a plurality of applications with SDKs (see FIG. 2B).

Base station 210 can include one or more devices capable of transferring traffic, such as audio, video, text, and/or other traffic, destined for and/or received from UE 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from UE 205 via an air interface. In some implementations, base station 210 can include a small cell base station, such as a base station of a microcell, a picocell, and/or a femtocell.

MME 215 can include one or more devices, such as one or more server devices, capable of managing authentication, activation, deactivation, and/or mobility functions associated with UE 205. In some implementations, MME 215 can perform operations relating to authentication of UE 205. Additionally, or alternatively, MME 215 can facilitate the selection of a particular SGW 220 and/or a particular PGW 225 to serve traffic to and/or from UE 205. MME 215 can perform operations associated with handing off UE 205 from a first base station 210 to a second base station 210 when UE 205 is transitioning from a first cell associated with the first base station 210 to a second cell associated with the second base station 210. Additionally, or alternatively, MME 215 can select another MME (not pictured), to which UE 205 should be handed off (e.g., when UE 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can also receive traffic from network 240 and/or other network devices, and can send the received traffic to UE 205 via base station 210. Additionally, or alternatively, SGW 220 can perform operations associated with handing off UE 205 to and/or from an LTE network.

PGW 225 can include one or more devices capable of providing connectivity for UE 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to UE 205 via SGW 220 and base station 210. PGW 225 can record data usage information (e.g., byte usage), and can provide the data usage information to AAA 235.

HSS 230 can include one or more devices, such as one or more server devices, capable of managing (e.g., receiving, generating, storing, processing, and/or providing) information associated with UE 205. For example, HSS 230 can manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with UE 205. For example, AAA 235 can perform authentication operations for UE 205 and/or a user of UE 205 (e.g., using one or more credentials), can control access, by UE 205, to a service and/or an application (e.g., based on one or more restrictions, such as time-of-day restrictions, location restrictions, single or multiple access restrictions, read/write restrictions, etc.), can track resources consumed by UE 205 (e.g., a quantity of voice minutes consumed, a quantity of data consumed, etc.), and/or can perform similar operations.

Network 240 can include one or more wired and/or wireless networks. For example, network 240 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

As shown in FIG. 2B, UE 205 includes application platform 250. Application platform 250 can include one or more applications 255(1) through 255(N) (N≥1) (hereinafter referred to collectively as "applications 255," and individually as "application 255"), which can include one or more SDKs 260(1) through 260(M) (hereinafter referred to collectively as "SDKs 260," and individually as "SDK 260"). While examples herein can refer to a same SDK 260 integrated into the applications 255, the applications 255 can include more than one SDK.

Application 255 includes one or more software applications that can be executed within application platform 250 of UE 205. For example, application 255 can include software associated with UE 205, a service, a game, a streaming service, a messaging service, a cloud service, an account management service, and/or any other software capable of being provided via UE 205. In some implementations, two or more of applications 255 can be associated with a same entity.

SDKs 260 can be integrated into applications 255 to collect data associated with UE 205 and/or provide the collected data to another device of environment 200. For example SDK 260 can monitor and/or collect characteristics or information associated with UE 205 based on sensors (e.g., accelerometers, gyroscopes, temperature sensors, light sensors, and/or the like), based on location services (e.g., using GPS information), using wireless signals and/or network information (e.g., using Bluetooth or Bluetooth low energy (BLE) signals, LAN information or signals, information or signals of base station 210, and/or the like), based on usage of the UE 205, based on battery levels of UE 205, based on performance levels of UE 205, and/or the like. Additionally, or alternatively, SDK 260 can provide such characteristics or information to a backend system or other devices of environment 200. For example, SDK 260 can provide such characteristics or information to the LTE network, IMS core, the EPC core, and/or network 240.

In FIG. 2B, the SDKs 260 can communicate with one another via communication bus 265. For example, the SDKs 260 can transmit and/or receive information associated with applications 255 and/or information associated with the SDKs 260. According to some implementations, one or more of SDKs 260 can be activated or deactivated based on the information associated with applications 255 and/or the information associated with SDKs 260 to prevent the same SDKs 260 from running on multiple applications 255.

The number and arrangement of devices and networks shown in FIGS. 2A and 2B are provided as an example. In practice, there can be additional devices and/or networks, fewer devices and/or networks, different devices and/or networks, or differently arranged devices and/or networks than those shown in FIGS. 2A and 2B. Furthermore, two or more devices shown in FIGS. 2A and 2B can be implemented within a single device, or a single device shown in FIGS. 2A and 2B can be implemented as multiple, distributed devices. Additionally, or alternatively, a set of devices (e.g., one or more devices) of environment 200 can perform one or more functions described as being performed by another set of devices of environment 200.

Figure 3:
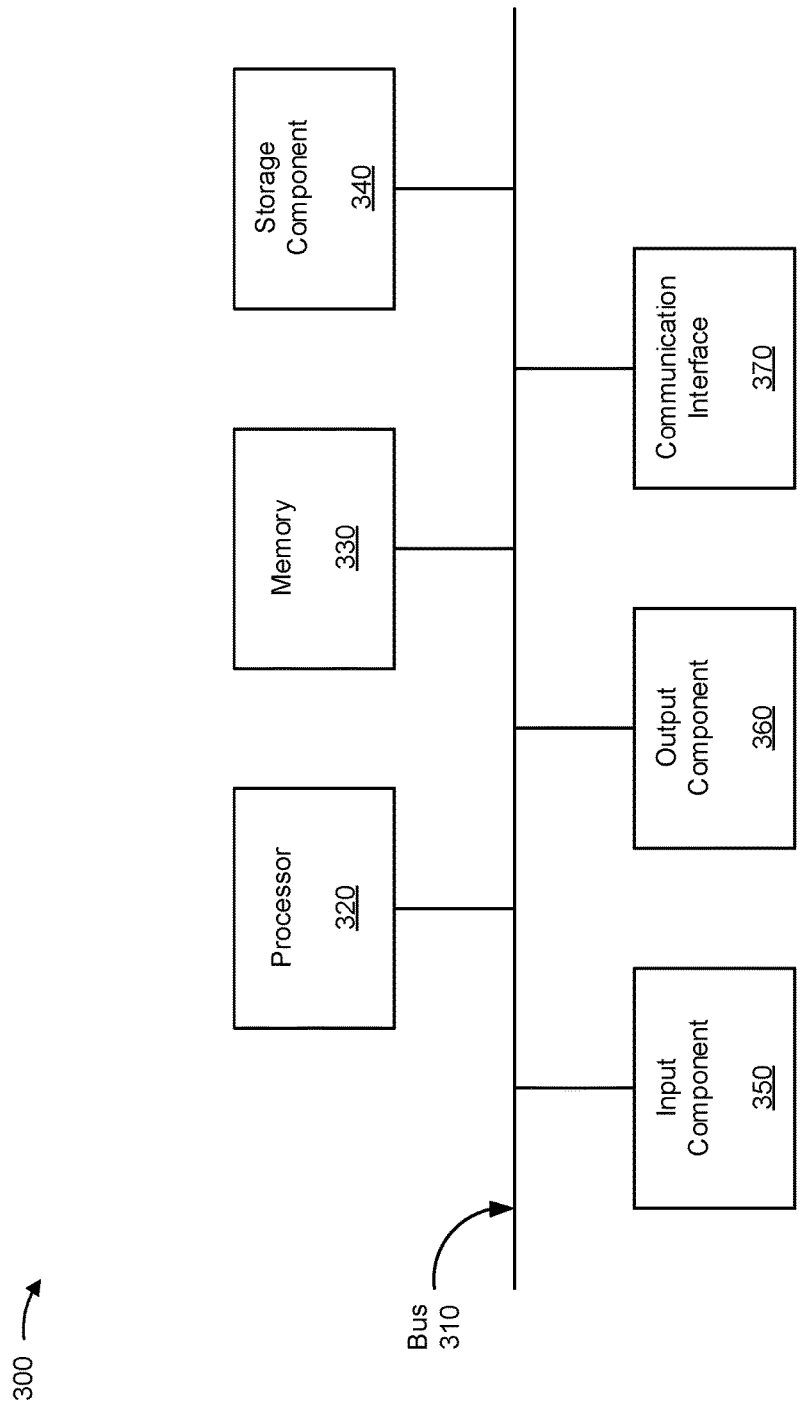
FIG. 3 is a diagram of example components of one or more devices of FIGS. 2A and 2B.

FIG. 3 is a diagram of example components of a device 300. Device 300 can correspond UE 205, base station 210, MME 215, SGW 220, PGW 225, HSS 230, AAA 235. In some implementations UE 205, base station 210, MME 215, SGW 220, PGW 225, HSS 230, AAA 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
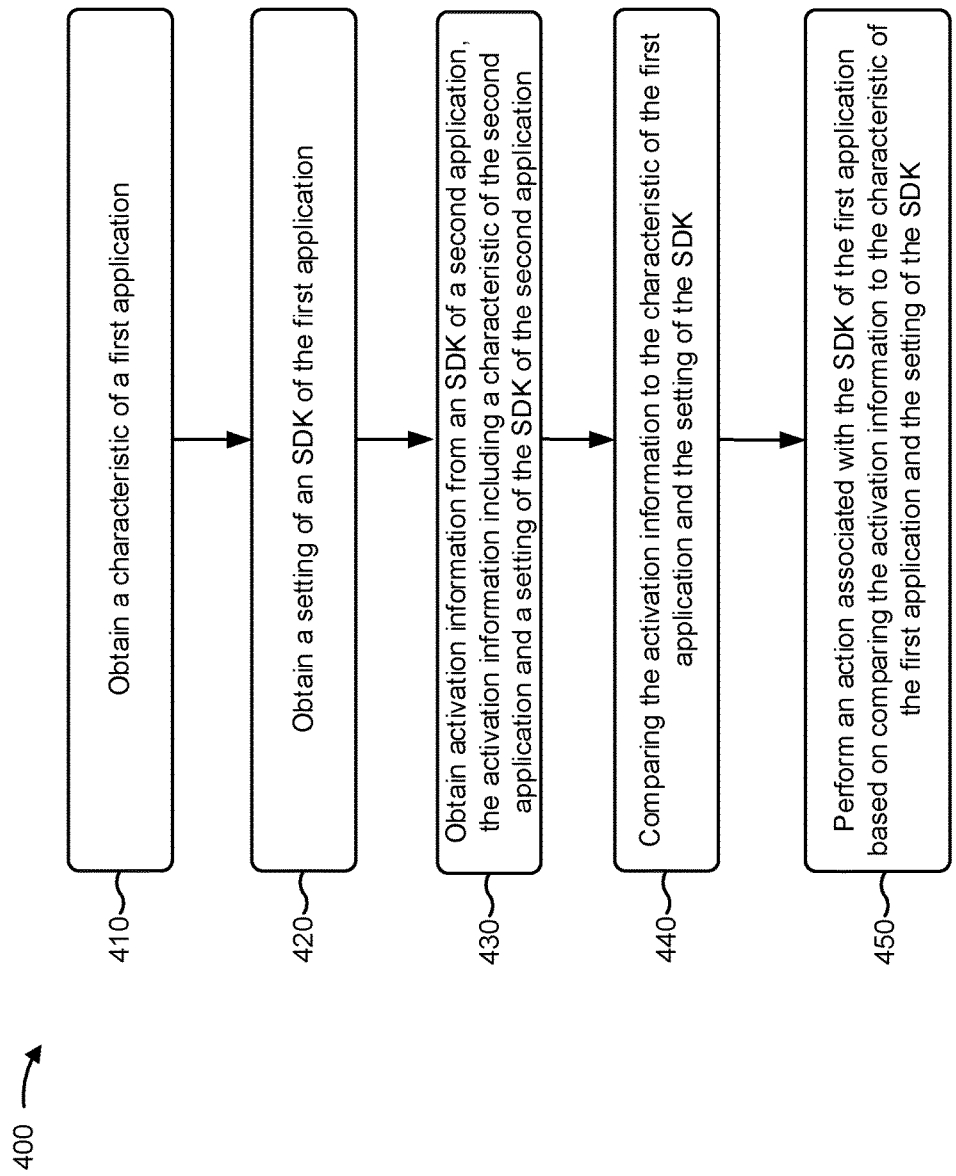
FIG. 4 is a flow chart of an example process for selecting a software development kit (SDK) of an application to be activated based on characteristics of the application.

FIG. 4 is a flow chart of an example process 400 for selecting a software development kit (SDK) of an application to be activated based on characteristics of the application. In some implementations, one or more process blocks of FIG. 4 can be performed by one or more SDKs 260 of the applications 255 in combination with hardware (e.g., components of UE 205) (e.g., to determine which of the SDKs are to be activated and which are to be deactivated to prevent duplicity and wasting resources of UE 205). In some implementations, one or more process blocks of FIG. 4 can be performed by another device or a group of devices separate from or including SDK 260, such as UE 205, base station 210, MME 215, SGW 220, PGW 225, HSS 230, and AAA 235.

Notably, in the examples to follow, reference to "SDK 260" and "application 255" can refer to a particular SDK 260 that is integrated into application 255, while reference to SDK 260 in association with "another SDK 260" or "the other SDK 260" can infer that "the other SDK 260" is integrated in "another application 255" that is separate from application 255. Furthermore, reference to "another application 255" or "the other application 255" can refer to one of applications 255 that is not integrated with "SDK 260."

As shown in FIG. 4, process 400 can include obtaining a characteristic of a first application (block 410). For example, SDK 260 can obtain one or more characteristics of application 255.

In some implementations, SDK 260 can periodically (e.g., every 5 minutes, every 10 minutes, every hour, every day, and/or the like) obtain the one or more characteristics of application 255. In some implementations, SDK 260 can aperiodically obtain the one or more characteristics and/or obtain the one or more characteristics of the application in response to a particular event or trigger (e.g., a user request, an installation of application 255, an integration of SDK 260, and/or the like). SDK 260 can obtain the characteristic of application 255 from information associated with application 255 stored in the application, in a data structure (e.g., a settings data structure) of UE 205, and/or the like.

In some implementations, a characteristic of application 255 can include application settings (e.g., location service settings (such as, GPS on/off, cell data on/off, and/or the like), login status, application permissions or user authorizations (such as, acceptance of an agreement, opt-in/opt-out status, etc.), application usage (e.g., an indication of the activity of the application and/or whether application 255 is used in foreground and/or background of UE 205), and/or the like. In some implementations, characteristics of application 255 can include characteristics of UE 205. For example, if UE 205 has settings that must be followed by application 255, those can be included in application characteristics obtained by SDK 260. As a more specific example, if a user opts-out of advertisement personalization on UE 205, such application characteristics can reflect such settings of UE 205.

In this way, SDK 260 can obtain one or more characteristics of application 255 that can be used to determine whether 260 is to be activated or be deactivated (if currently active), or remain inactive.

As further shown in FIG. 4, process 400 can include obtaining a setting of an SDK of the first application (block 420). For example, SDK 260 can obtain or determine one or more settings of SDK 260. SDK 260 can obtain settings of SDK 260 based on information corresponding to a state of the SDK. In some implementations, SDK 260 can obtain the settings from a remote control configuration (RCC) value indicating that the SDK is active, inactive, or partially active.

According to some implementations, settings of SDK 260 can indicate an activation state of SDK 260, a request state of SDK 260, and/or a version of SDK 260. For example, an activation state of SDK 260 can indicate whether SDK 260 is active (e.g., running/operating in application 255 to collect and/or provide data associated with UE 205), inactive (not running in application 255), or partially active (operating at a threshold level (e.g., at a lower percentage to account for low battery or other conditions of UE 205)). A request state of an SDK 260 can include whether SDK 260 has initiated a request to determine whether to activate/deactivate or whether SDK 260 was requested by another SDK 260 to provide information associated with activation/deactivation. The version of SDK 260 can be obtained to be compared with versions of other SDKs 260, such information associated with the characteristics of the application and/or setting of the SDK can be appropriately compared. For example, a newer version of SDK 260 can have access to more characteristics of an application or more settings of SDK 260 than an older version of SDK 260.

In this way, SDK 260 can obtain one or more settings of SDK 260 to determine whether SDK 260 is to be activated or deactivated and/or whether other SDKs of other applications 255 are to be activated or deactivated.

As further shown in FIG. 4, process 400 can include obtaining activation information from an SDK of a second application, the activation information including a characteristic of the second application and a setting of the SDK of the second application (block 430). For example, SDK 260 can obtain the activation information from another SDK 260 of another application that includes a characteristic of the other application 255 and a setting of the other SDK 260 of the other application 255.

In some implementations, SDK 260 can obtain the activation information based on obtaining the characteristic of application 255 and/or the setting of SDK 260. For example SDK 260 can send a request for the activation information to the other SDK 260 (e.g., SDK 260 initiates the request to activate/deactivate). In some implementations, the SDK 260 can provide the characteristic of the application and/or the setting of SDK 260 in the request. In some implementations, SDK 260 can obtain the activation information in a message from the other SDK 260 and/or in a request from the other SDK 260 indicating that SDK 260 is to send the characteristic of application 255 and/or the setting of SDK 260 to the other SDK 260 (i.e., the other SDK 260 initiated the request to determine whether to activate/deactivate).

In some implementations, the characteristic of the other application 255 can correspond to the characteristic of application 255 and the setting of the other SDK 260 can correspond to the setting of SDK 260. Furthermore, in some implementations, multiple characteristics of the other application 255 and/or multiple settings of the other SDK 260 can be obtained. In such implementations, SDK 260 can compare the multiple characteristics of the other application 255 to the corresponding multiple characteristics of application 255 and SDK 260 can compare the multiple settings of the other SDK 260 to the settings of SDK 260 (e.g., based on a version associated with SDK 260 and the other SDK 260).

In this way, SDK 260 can obtain activation information from another SDK 260 to determine whether SDK 260 and/or the other SDK 260 are to be activated/deactivated.

As further shown in FIG. 4, process 400 can include comparing the activation information to the characteristic of the first application and the settings of the SDK (block 440). For example, SDK 260 can compare the activation information from the other SDK 260 to the characteristic of application 255 and the setting of SDK 260.

In some implementations, SDK 260 can compare the activation information to the characteristic of application 255 and the setting of SDK 260 using a scoring and/or weighting system. For example, SDK 260 can calculate a first activation score based on the characteristic of the first application and the setting of the SDK and a second activation score based on the activation information from the second information. Accordingly, based on the first activation score and the second activation score, SDK 260 can determine which of the SDKs 260 are to be activated (e.g., which has the higher and/or lower activation score). For example, a higher activation score can indicate that the corresponding SDK 260 is to be active and the lower activation score can indicate that the corresponding SDK 260 is to be inactive (or vice versa).

As a specific example of calculating activation scores, an activation score S can be equal to an application characteristic (e.g., location services) score L plus a setting of an SDK 260 score R (i.e., S=L+R). In such a case, to determine L, a weighted score of '1000' can be applied when location services are turned 'on' for an application and '0' when location services are turned 'off' for an application. Additionally, or alternatively, to determine R a weighted score of '100' can be applied when SDK 260 is 'active,' '50' when SDK 260 is 'partially active,' and '0' when SDK 260 is 'inactive.' Accordingly, using these scores, SDK 260 can determine whether to be active or inactive when compared with activation scores of the other SDKs 260.

In some implementations, activation scores can be the same. Accordingly, in such instances, a tiebreaker policy can be implemented to select which of the SDKs 260 are to be active and which are to be inactive. For example, the SDK 260 that initiated the selection process to activate/deactivate SDKs (to prevent multiple instances of the same SDK from running) can be set as the active SDK 260 (e.g., the only active SDK 260). In some implementations, if one of the SDKs 260 with a tied high score is currently active, that SDK 260 can remain active (e.g., as the only active SDK 260 of the SDKs 260) and the other SDKs 260 are to be inactive.

As further shown in FIG. 4, process 400 can include performing an action associated with the SDK of the first application based on comparing the activation information to the characteristic of the first application and the setting of the SDK (block 450). For example, SDK 260 can perform the action associated with SDK 260.

In some implementations, SDK 260 can perform an action to activate SDK 260, partially activate SDK 260, and/or deactivate SDK 260. For example, to activate SDK 260, SDK 260 can begin running in application 255. To partially activate SDK 260, SDK 260 can run a portion of the functions of SDK 260 in application 255. For example, SDK 260 can run functions that collect data in a manner that does use a threshold amount of resources (e.g., battery power, computing power, and/or the like) of UE 205. Additionally, or alternatively, SDK 260 can deactivate SDK 260 by stopping execution or running of SDK 260 in application 255 (e.g., such that all operations or functions of SDK 260 are halted). In some instances, SDK 260 can perform an action to maintain a state of SDK 260 (e.g., wait to initiate another SDK selection process, wait to receive a request associated with an SDK selection process, and/or the like).

According to some implementations, an active SDK 260 can collect and/or provide information associated with UE 205. In some implementations, active SDK 260 can activate or include an SDK manager to control the active SDK. An example SDK manager can determine whether to collect data, determine an amount of data to be collected, determine a frequency at which data is to be collected, and/or the like based on characteristics associated with UE 205 and/or settings of application 255 of active SDK 260.

The following examples describe example processes that can be performed by an SDK manager of an active SDK. The SDK manager can map a device state and configuration of SDK 260 to a set of processes (or strategies) to determine a quantity, quality, and frequency at which data is to be monitored, collected, and/or provided (e.g., to a backend system for analytics) by SDK 260.

An SDK manager of an active SDK 260 can determine characteristics associated with UE 205. For example, the SDK manager can determine operating system (OS) information corresponding to an OS of UE 205, model information corresponding to a model of UE 205, manufacturer information corresponding to a manufacturer of UE 205, feature information corresponding to features of UE 205, sensor information associated with sensors of UE 205, and/or battery information corresponding to a battery of UE 205. Based on the characteristics and/or state of the UE 205, the SDK manager of SDK 260 can determine if UE 205 can be supported by SDK 260. In some implementations, the SDK manager of SDK 260 can determine that UE 205 is not supported based on the OS information, the model information, manufacturer information, feature information, sensor information, and/or battery information. For example, an SDK manager of SDK 260 can determine that UE 205 is supported based on the OS information, the model information, and/or the manufacturer information but does not include a particular feature as shown in the feature information. In such a case the SDK manager can deactivate SDK 260 in the corresponding application 255. However, if the required features are available for a UE 205 that can be supported by SDK 260, then the SDK manager of SDK 260 uses the battery level (of the battery information) to determine how to collect and/or provide data associated with UE 205. For example, if a battery level satisfies a threshold (e.g., if the battery level is high), then data collection will be more aggressive (e.g., more frequent, greater amounts of data, and/or the like). On the other hand, if the battery level does not satisfy a threshold (e.g., if the battery level is low), then data collection can be limited and/or turned off.

In some implementations, the SDK manager of SDK 260 can set the SDK 260 to active, partially active, or inactive based on characteristics of UE 205. As mentioned above, when the SDK manager of SDK 260 sets SDK 260 to inactive, SDK 260 does not collect or provide any information associated with UE 205. When the SDK manager sets SDK 260 to active, then SDK 260 can collect and/or provide data associated with UE 205 (e.g., for analysis, for location determination, and/or the like). When the SDK manager sets SDK 260 to partially active, SDK 260 can collect a threshold amount of data (e.g., a percentage of data that is collected when SDK 260 is active) associated with UE 205, and/or can collect data at a threshold frequency (e.g., a multiple of the period of time that is between when data is collected when SDK 260 active). For example, a partially active SDK 260 can collect fifty percent of the data collected when SDK 260 is partially active. Accordingly, if SDK 260 collects data associated with UE 205 for ten second intervals, when partially active, SDK 260 collects data associated with UE 205 for five second intervals. Additionally, or alternatively, if the period of time between data collection intervals is 15 minutes when SDK 260 is active, then the period of time between data collection intervals for a partially active SDK 260 can be 30 mins.

In some implementations, the SDK manager of an active SDK 260 can determine a specific type of data that is to be collected. For example, the SDK manager can collect location information of UE 205 (e.g., geographical coordinates, a location within a building, a location relative to an object, a location on a map, and/or the like) that indicates a location or information about a location of UE 205. The location information can be collected using a GPS of UE 205, a triangulation calculation from signals of base station 210 and/or other base stations of environment 200, and/or location information from other applications 255.

In some implementations, the SDK manager of an active SDK 260 can determine a location of UE 205 based on the characteristics of UE 205. For example, in a high power mode (when UE 205 has at least 80% battery level), the SDK manager of SDK 260 can perform a high accuracy determination of the location of UE 205, which can collect more data and/or collect data more frequently than a lower accuracy calculation of UE 205. On the other hand, in a low power mode (e.g., when UE 205 has less than 50% battery level), the SDK manager of SDK 260 can perform a low accuracy determination of the location of UE 205, which can collect less data and/or collect data less frequently than a higher accuracy calculation of UE 205. In some implementations, the SDK manager of SDK 260 can update a location based on UE 205 moving a particular distance (e.g., based on detection from sensors or devices of UE 205).

Additionally, or alternatively, the SDK manager of SDK 260 can collect Bluetooth information and/or Wi-Fi information associated with UE 205. For example, the SDK manager, via SDK 260, can utilize application 255 to perform a Bluetooth scan and/or a Wi-Fi scan. The Bluetooth scan and/or Wi-Fi scan can be performed periodically, for a particular length of time, and/or until a particular number of Bluetooth devices and/or Wi-Fi devices are detected according to characteristics of UE 205.

In some implementations, the SDK manager of SDK 260 can collect activity information associated with UE 205. The activity information associated with SDK 260 can include applications being opened or closed, input and/or output being provided, applications running in the background, communications with a network, and/or the like. The example SDK manager of SDK 260 can collect activity information for a particular period of time, at a particular frequency, and/or in response to particular events according to characteristics of UE 205. Furthermore, in some implementations, the SDK manager of SDK 260 can collect sensor information associated with sensors (e.g., accelerometers, gyroscopes, temperature sensors, cameras, heart rate sensors, and/or the like) of UE 205. The example SDK manager of SDK 260 can collect sensor information for a particular period of time, at a particular frequency, and/or in response to an event based on characteristics of UE 205.

In this way, SDK 260 can perform an action associated with SDK 260 to ensure that multiple SDKs are not running on multiple applications 255, thus preventing duplicity and waste of resources of UE 205.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
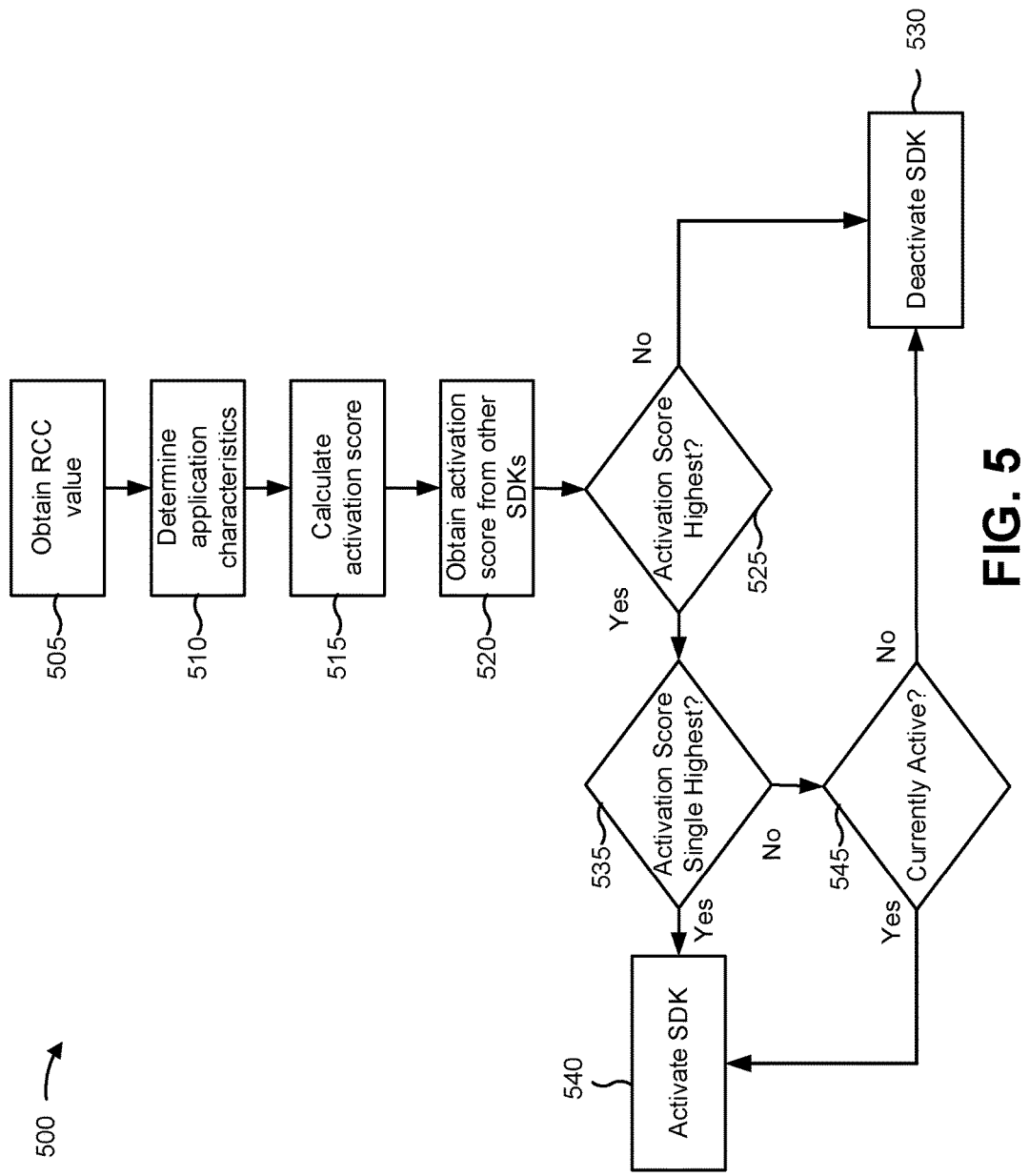
FIG. 5 is a flow chart of an example process relating to the example process shown in FIG. 4.

FIG. 5 is a diagram of an example process 500 relating to example process 400 shown in FIG. 4. FIG. 5 shows an example process of selecting an SDK of an application to be activated based on characteristics of the application. In some implementations, one or more process blocks of FIG. 5 can be performed by one or more SDKs 260 of applications 255 in combination with hardware (e.g., components of UE 205) (e.g., to determine which of the SDKs are to be activated and which are to be deactivated to prevent duplicity and wasting resources of UE 205). In some implementations, example process 500 can be executed periodically or aperiodically (e.g., in response to an event or trigger).

As shown in FIG. 5, example process 500 can include obtaining an RCC value (block 505) as described above in connection with block 420 of FIG. 4. For example, SDK 260 can determine a setting (e.g., active, inactive, partially active, and/or the like) of SDK from the RCC value. Further, example process 500 can include determining application characteristics (block 510) as described above in connection with block 410 of FIG. 4. As shown, example process 500 includes calculating an activation score (e.g., based on the RCC value and the application characteristics) (block 515). Further, example process 500 can include retrieving activation scores (or information corresponding to activation scores) from other SDKs 260 (block 520).

In the example process 500, SDK 260 can determine whether the activation score of SDK 260 is a highest score (when compared with activation scores of other SDKs) (block 525). If the activation score is not the highest (block 525), then example process 500 can include deactivating SDK 260 (block 530). In such cases, one other SDK 260 can be activated based on the activation scores. If the activation score of SDK 260 is a highest score (when compared with activation scores of the other SDKs) (block 525), then example process 500 can include determining whether the activation score of SDK 260 is the single highest (i.e., whether the activation score of SDK 260 is tied with an activation score of one or more other SDKs 260) (block 535). If the activation score of SDK 260 is the single highest (block 535), then SDK 260 can activate SDK 260 (e.g., by running SDK 260 in application 255) (block 540). In such cases, other SDKs 260 can be deactivated based on the activations scores.

If the activation score of SDK 260 is not the single highest (i.e., there is a tie with another SDK 260) (block 535), then example process 500 can include determining whether SDK 260 is currently active (block 545). If SDK 260 is currently active (block 545), then SDK 260 activates SDK 260 (and/or remains active) (block 540). In such cases, other SDKs 260 can be deactivated based on the activation scores. If SDK 260 is not currently active (block 545), then SDK 260 can deactivate SDK 260 (or remain inactive) (block 530).

In this way, SDKs 260 can determine whether to be activated or deactivated to ensures that only one of the SDKs 260 are activated to prevent duplicity among one another and wasting resources of UE 205.

As indicated above, FIG. 5 is provided merely as an example. Other examples are possible and can differ from what was described with regard to FIG. 5.

FIG. 6 is a diagram of an example implementation 600 relating to example process 400 shown in FIG. 4. FIG. 6 shows an example of selecting an SDK of an application to be activated based on characteristics of the application. The example implementation 600 includes an exchange of information between a first SDK 260(1) and a second SDK 260(2). According to some implementations, SDK 260(1) can correspond to SDK 260 and SDK 260(2) can correspond to another SDK 260 as described in the above examples.

As shown in FIG. 6 and by reference number 610, SDK 260(1) initiates a selection process for an SDK to be active. SDK 260(1) can then provide characteristics of application 255(1) and settings of SDK 260(1) and request characteristics of application 255(2) and settings of SDK 260(2) from SDK 260(2), as shown by reference number 620. Based on receiving the request, SDK 260(2) can determine whether to be active or inactive, as shown by reference 630. For example SDK 260(2) is currently active and characteristics of application 255(1) and settings SDK 260(1) yield a higher score than an activation score of SDK 260(2), then SDK 260(2) can be deactivated. If SDK 260(2) is not active, SDK 260(2) can determine whether it should be activated or not. For example, SDK 260(2) can activate SDK 260(2) if the activation score of SDK 260(2) is higher than an activation score of SDK 260(1) or remain inactive if the activation score of SDK 260(2) is lower than the activation score of SDK 260(1).

After determining whether to be active or inactive, SDK 260(2) can provide characteristics of application 255(2) and settings of SDK 260(2) (and/or an activation score of SDK 260(2)) to SDK 260(1)), as shown by reference number 640. Based on the response, SDK 260(1) determines whether to be active or inactive, as shown by reference number 650. As the initiating SDK 260, if SDK 260(1) is inactive, SDK 260(1) determines whether to be active or inactive based on the activation score of SDK 260(2) (and/or activation scores of other SDKs 260 in communication with SDK 260(1) and SDK 260(2)) and if SDK 260(2) (or any other SDK 260) is not active. For example, if SDK 260(1) has the highest activation score and SDK 260(2) (and all other SDKs 260) are inactive, SDK 260(1) can be activated. Otherwise, in such a case, if SDK 260(1) does not have the highest activation score or if SDK 260(2) (or any other SDK 260) is active, then SDK 260(1) can remain inactive.

On the other hand, referring to reference number 650, if SDK 260(1) is active, then SDK 260(1) can determine whether to remain active or be deactivated based on the activation score received from 260(2) (and/or activation scores from other SDKs 260). For example, if SDK 260(1) has the highest activation score, it can remain active, but if SDK 260(1) did not have the highest score, it can be deactivated.

Accordingly, the example exchange in example implementation 600 enables the SDKs 260 to coordinate to ensure that a single SDK 260 is active to prevent duplicity and a waste of resources of UE 205.

As indicated above, FIG. 6 is provided merely as an example. Other examples are possible and can differ from what was described with regard to FIG. 6.

According to some implementations, SDKs of applications can be activated or inactivated to collect and/or provide information associated with a UE in a manner that prevents duplicity and/or waste of resources of the UE. In some implementations, instances of a same SDK can be installed on multiple applications. In such cases, according to some implementations herein, only one of the instances of the SDKs are active at a time to ensure that resources of UE 205 are not wasted collecting or providing the same data multiple times.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
obtain a characteristic of a first application;
obtain a setting of a software development kit (SDK) of the first application,
the SDK of the first application being installed on the first application;
obtain activation information from an SDK of a second application,
the SDK of the second application being installed on the second application, and
the activation information including a characteristic of the second application and a setting of the SDK of the second application;
compare the activation information to the characteristic of the first application and the setting of the SDK; and
perform an action associated with the SDK of the first application based on comparing the activation information to the characteristic of the first application and the setting of the SDK,
the action to at least one of: activate, partially activate, deactivate, or maintain a state of the SDK of the first application.

2. The device of claim 1, where the SDK of the first application and the SDK of the second application are instances of a same SDK.

3. The device of claim 1, where the one or more processors, when comparing the activation information to the characteristic of the first application and the setting of the SDK, are to:
calculate a first activation score based on the characteristic of the first application and the setting of the SDK and a second activation score based on the activation information from the second application,
where the one or more processors, when performing the action are to:
perform the action based on the first activation score and the second activation score.

4. The device of claim 1, where the one or more processors, when obtaining the activation information of the SDK of the second application, are to:
obtain the activation information of the SDK of the second application based on receiving a request from the SDK of the second application for the characteristic of the first application and the setting of the SDK of the first application.

5. The device of claim 1, where the one or more processors, when performing the action, are to:
activate the SDK of the first application to collect and/or provide information associated with a user equipment associated with the first application and the second application.

6. The device of claim 1, where the one or more processors, when performing the action are to:

determine that the SDK of the first application is active; and deactivate the SDK of the first application to prevent the SDK from collecting and/or providing information associated with a user equipment associated with the first application and the second application.

7. The device of claim 1, where the one or more processors, when performing the action are to:

determine that the SDK of the first application is inactive; and activate the SDK of the first application when the SDK of the second application is not active.

8. A method, comprising:

obtaining, by a device, a characteristic of a first application;

obtaining, by the device, a setting of a software development kit (SDK) of the first application,
the SDK of the first application being installed on the first application;

obtaining, by the device, activation information from an SDK of a second application,
the SDK of the second application being installed on the second application, and
the activation information including a characteristic of the second application and a setting of the SDK of the second application;

comparing, by the device, the activation information to the characteristic of the first application and the setting of the SDK; and performing, by the device, an action associated with the SDK of the first application based on comparing the activation information to the characteristic of the first application and the setting of the SDK,
the action to at least one of: activate, partially activate, deactivate, or maintain a state of the SDK of the first application.

9. The method of claim 8, where the SDK of the first application and the SDK of the second application are instances of a same SDK.

10. The method of claim 8, where the method, when comparing the activation information to the characteristic of the first application and the setting of the SDK, comprises:

calculating, by the device, a first activation score based on the characteristic of the first application and the setting of the SDK and a second activation score based on the activation information from the second application, where the method, when performing the action, comprises:
performing the action based on the first activation score and the second activation score.

11. The method of claim 8, where the method, when obtaining the activation information of the SDK of the second application, comprises:

obtaining, by the device, the activation information of the SDK of the second application based on receiving a request from the SDK of the second application for the characteristic of the first application and the setting of the SDK of the first application.

12. The method of claim 8, where the method, when performing the action, comprises:

activating, by the device, the SDK of the first application to collect and/or provide information associated with a user equipment associated with the first application and the second application.

13. The method of claim 8, where the method, when performing the action, comprises:

determining, by the device, that the SDK of the first application is active; and deactivating, by the device, the SDK of the first application to prevent the SDK from collecting and/or providing information associated with a user equipment associated with the first application and the second application.

14. The method of claim 8, when performing the action, comprises:

determining, by the device, that the SDK of the first application is inactive; and activating, by the device, the SDK of the first application when the SDK of the second application is not active.

15. A non-transitory computer-readable medium storing instructions, the instructions comprising:

one or more instructions that, when executed by one or more processors, cause the one or more processors to:

obtain a characteristic of a first application;

obtain a setting of a software development kit (SDK) of the first application,
the SDK of the first application being installed on the first application;

obtain activation information from an SDK of a second application,
the SDK of the second application being installed on the second application, and
the activation information including a characteristic of the second application and a setting of the SDK of the second application;

compare the activation information to the characteristic of the first application and the setting of the SDK; and perform an action associated with the SDK of the first application based on comparing the activation information to the characteristic of the first application and the setting of the SDK,
the action to at least one of: activate, partially activate, deactivate, or maintain a state of the SDK of the first application.

16. The non-transitory computer-readable medium of claim 15, where the SDK of the first application and the SDK of the second application are instances of a same SDK.

17. The non-transitory computer-readable medium of claim 15, where the one or more instructions, that cause the one or more processors to compare the activation information to the characteristic of the first application and the setting of the SDK, cause the one or more processors to:

calculate a first activation score based on the characteristic of the first application and the setting of the SDK and a second activation score based on the activation information from the second application, where the one or more processors, when performing the action are to:
perform the action based on the first activation score and the second activation score.

18. The non-transitory computer-readable medium of claim 15, where the one or more instructions, that cause the one or more processors to perform the action, cause the one or more processors to:

activate the SDK of the first application to collect and/or provide information associated with a user equipment associated with the first application and the second application.

19. The non-transitory computer-readable medium of claim 15, where the one or more instructions, that cause the one or more processors to perform the action, cause the one or more processors to:

determine that the SDK of the first application is active; and deactivate the SDK of the first application to prevent the SDK from collecting and/or providing information associated with a user equipment associated with the first application and the second application.

20. The non-transitory computer-readable medium of claim 15, where the one or more instructions, that cause the one or more processors to perform the action, cause the one or more processors to:

determine that the SDK of the first application is inactive; and activate the SDK of the first application when the SDK of the second application is not active.

* * * * *